United States Patent [19]

Meyerhoff et al.

[11] Patent Number: 4,794,680
[45] Date of Patent: Jan. 3, 1989

[54] NOVEL WEAR-RESISTANT LASER-ENGRAVED CERAMIC OR METALLIC CARBIDE SURFACES FOR FRICTION ROLLS FOR WORKING ELONGATE MEMBERS, METHOD FOR PRODUCING SAME AND METHOD FOR WORKING ELONGATE MEMBERS USING THE NOVEL FRICTION ROLL

[75] Inventors: Robert W. Meyerhoff, Zionsville, Ind.; Richard C. Hill, Charlotte, N.C.

[73] Assignee: Union Carbide Corporation, Danbury, Conn.

[21] Appl. No.: 811,334

[22] Filed: Dec. 20, 1985

[51] Int. Cl.$^4$ .......................................... B21B 27/00
[52] U.S. Cl. ..................... 29/132; 29/121.1; 219/121.69; 219/121.71; 219/121.72
[58] Field of Search .................. 29/132, 121; 19/143, 19/236, 258; 219/121, 121 LM, 121 L, 121 LN, 121 LK, 121 LL, 121 LH, 121 LS; 101/426; 428/556, 551; 156/639

[56] References Cited

U.S. PATENT DOCUMENTS

| | | | |
|---|---|---|---|
| 2,373,876 | 4/1945 | Cutler | 19/143 |
| 2,386,583 | 10/1945 | Bacon | 19/143 |
| 2,393,953 | 2/1946 | Bacon | 19/143 |
| 2,450,409 | 10/1948 | Baymiller | 19/143 |
| 2,450,410 | 10/1948 | Baymiller | 19/143 |
| 2,863,175 | 12/1958 | Meyer | 19/143 |
| 3,588,489 | 6/1971 | Keller et al. | 219/121 |
| 3,654,864 | 4/1972 | Ovshinsky | 101/426 |
| 3,902,234 | 9/1975 | Fernandes | 29/132 |
| 3,924,093 | 12/1975 | Feldman et al. | 219/121 LM |
| 3,924,313 | 12/1975 | Broderick | 29/121 |
| 4,009,658 | 3/1977 | Heurich | 29/132 |
| 4,015,221 | 3/1977 | Dalton | 219/121 L |
| 4,032,743 | 6/1977 | Erbach et al. | 219/121 LM |
| 4,057,350 | 11/1977 | Craig | 356/199 |
| 4,087,672 | 5/1978 | Yi | 219/121 LM |
| 4,128,752 | 12/1978 | Gravel | 219/121 L |
| 4,131,782 | 12/1978 | Einstein et al. | 219/121 LM |
| 4,173,685 | 11/1979 | Weatherly | 428/556 |
| 4,200,382 | 4/1980 | Friedman | 219/121 LM |
| 4,248,369 | 2/1981 | Clausen | 219/121 LN |
| 4,288,889 | 9/1981 | Tikhonou et al. | 19/236 |
| 4,322,600 | 3/1982 | Crahay | 219/121 LK |
| 4,347,785 | 9/1982 | Chase et al. | 219/121 L |
| 4,352,973 | 10/1982 | Chase | 219/121 LH |
| 4,391,879 | 7/1983 | Fabian et al. | 428/551 |
| 4,417,369 | 11/1983 | Hoover | 19/258 |
| 4,489,461 | 12/1984 | Hasegawa et al. | 19/258 |
| 4,504,354 | 3/1985 | George et al. | 156/639 |
| 4,519,840 | 5/1985 | Jackson et al. | 428/546 |
| 4,524,785 | 6/1985 | Seragnoli et al. | 219/121 LM |
| 4,547,936 | 10/1985 | Bacchio | 19/258 |

FOREIGN PATENT DOCUMENTS

| | | |
|---|---|---|
| 1009507 | 5/1977 | Canada . |
| 3220534A1 | 6/1982 | Fed. Rep. of Germany . |
| 3139646A1 | 7/1982 | Fed. Rep. of Germany . |
| 0045088 | 3/1984 | Japan . |
| 0047086 | 3/1984 | Japan . |
| 1407079 | 9/1975 | United Kingdom . |
| 2049102A | 12/1980 | United Kingdom . |
| 1585143 | 2/1981 | United Kingdom . |

*Primary Examiner*—Howard H. Goldberg
*Assistant Examiner*—Irene Cuda
*Attorney, Agent, or Firm*—James L. Sonntag

[57] ABSTRACT

The invention is to friction rolls for working elongate members, e.g., webs or strands, such as crimper rolls, draw rolls, yarn package drive rolls comprising a roll having a generally cylindrical external surface and a ceramic, e.g., alumina, mixtures of alumina and titania, chromia, zirconia, or metallic carbide, e.g., tungsten carbide, coating bonded to the external surface, the coating being laser-engraved, that is, having a plurality of laser-formed depressions having a pattern covering substantially the entire exterior working surface of the roll and providing a uniform, wear-resistant surface texture over substantially the entire working surface.

26 Claims, 3 Drawing Sheets

NOVEL WEAR-RESISTANT LASER-ENGRAVED CERAMIC OR METALLIC CARBIDE SURFACES FOR FRICTION ROLLS FOR WORKING ELONGATE MEMBERS, METHOD FOR PRODUCING SAME AND METHOD FOR WORKING ELONGATE MEMBERS USING THE NOVEL FRICTION ROLL

BACKGROUND OF THE INVENTION

1. Field of the Invention

This invention relates to friction rolls for elongate members, e.g., webs or strands such as those used in the textile, paper or steel industries and more particularly refers to friction rolls for webs or strands, e.g., crimper rolls, draw rolls, yarn package drive rolls, guide pins, friction pins, etc. having laser-engraved surfaces that are wear-resistant and that are adapted to readily and quickly grip the web or strand being moved and to quickly and completely release the web or strand after it has passed the roll.

2. Prior Art

In the textile industry, exceptional effort has been expended and is continuing to be expended towards the development of friction rolls having surfaces suitable for driving or working on yarns, strands, filaments or webs at relatively high speeds. Much of this work has been directed to the modification of the roll surface to render it more adaptable to gripping the yarn, filament, strand or web quickly and readily and then releasing it quickly and readily after it has moved past the roll. For example, U.S. Pat. No. 2,863,175 describes the problems of "lapping-up" and "eyebrowing" and describes the numerous attempts at using sleeve-like roll covers known as cots in efforts to overcome the lapping-up and eyebrowing problems. For example, leather cots have previously been tried as well as cots made of synthetic materials which show considerably longer life than leather. In spite of these efforts, the lapping-up and eyebrowing problems persisted as well as the short life for the roll surface, i.e., the cot.

U.S. Pat. No. 3,902,234 embeds finely divided catalyst particles in the interstices of a yarn contacting surface such as are used on yarn-carrying rollers. In addition, U.S. Pat. No. 2,373,876 proposed the addition of graphite to synthetic rubber-like compositions for textile roll surfaces. Another patent, U.S. Pat. No. 2,386,583, proposed the use of rubber particles having a hardness greater than that of the main rubber body of the roll. Cots made of fibrous materials are disclosed in U.S. Pat. No. 2,393,953. Furthermore, materials such as cork within rubber-like compositions are disclosed in U.S. Pat. Nos. 2,450,409 and 2,450,410.

U.S. Pat. 2,863,175 discloses the embedding of frangible particles throughout a rubber-like composition adapted to be used as a roll cover. Thereafter, the surface of the rubber cover is subjected to a grinding action to break the frangible particles to leave a plurality of cavities or voids in the surface of the unit. Obviously, the voids or cavities thus formed are randomly located on the surface of the cot because of the random dispersion of the frangible particles within the rubber composition and the surface of the cot lacks any pattern of cavities or voids. More recently, U.S. Pat. No. 4,547,936 proposes the use of rolls which have a resilient covering of highly flexible steel wires extending radially. None of the above efforts have met with substantial success in completely overcoming the eyebrowing, lapping-up, and short life problems encountered in high speed textile operations.

In recent years, textile rolls have been provided with chromia, alumina, mixtures of alumina and titania, or mixtures of chromia and alumina coatings to provide wear-resistance. These coatings have met with some success but are subject to rapid wear or corrosion when subjected to even low or moderate corrosive conditions such as could be encountered in a textile plant if the fiber contains an antistatic material, for example, or if the fiber or yarn is still wet or damp from a previous treatment. Comparable friction rolls having metallic carbide surfaces have been tried but, because of the coefficient of friction conditions of such coating surfaces, the yarn, fiber or web was not quickly and readily gripped and then quickly and readily released by the roll except for crimp rolls and thus found little or no use except as crimp rolls.

U.S. Pat. No. 4,322,600 discloses a sheet steel rolling mill roll having a predetermined pattern laser-formed of microcavities on its surface for the purpose of endowing the thin steel sheet being rolled with a suitable morphology for improving its deep-drawing properties as a result of contact with the rolls. The microcavities, however, are formed in the steel surface of the rolling mill roll and there is no disclosure or suggestion of providing a friction roll having a laser-engraved ceramic or metallic carbide coating on it.

Transfer rolls for transferring ink or other medium to a printing roll or directly to material being printed or treated have been made with a ceramic coating and provided with a pattern of laser-formed depressions. Transfer rolls of this type are utilized for transferring ink or other materials and are therefore not subjected to any substantial tensioning, crumpling, stressing or bending forces. Therefore, transfer rolls are generally made of hollow parts to reduce cost and weight. Transfer rolls of this type, because of their lack of tensile and compressive strength, are not suitable for use as crimper rolls. An example of transfer rolls of this type is described in U.K. patent application GB No. 2049102A. Other types of laser-engraved, chromia-coated, transfer rolls have long been made, sold and used in the United States and elsewhere.

None of the prior art disclosed above or known discloses web- or strand-handling friction rolls, or friction rolls that work, e.g., stretch, tension, crimp, surface-modify elongate members, or perform any other work on the elongate members, wherein said friction rolls have a structure and a ceramic or metallic carbide coating bonded to the cylindrical external working surface of the roll and a pattern of laser-formed depressions in the ceramic or metallic carbide coating.

SUMMARY OF THE INVENTION

The present invention is based upon the unexpected finding that web or strand friction rolls having a ceramic or metallic carbide coating bonded to the exterior working surface thereof and a pattern of a plurality of laser-formed depressions covering substantially the entire working surface of said coating provides a uniform, wear-resistant working surface texture which will quickly and readily grip the strand or web contacting the working surface, such as, in draw rolls or mating crimp rolls, and then quickly and readily release the strand or web when it passes out of contact with the working surface. The unexpected quick release feature is believed to be due to a smooth, i.e., not jagged, but rough textured surface of the rolls of the present invention as compared to rolls that have been provided with a ceramic or metallic carbide coating followed by scratching or grinding in order to provide roughness to the coating without laser treatment. Furthermore, the laser-formed depressions of the novel rolls of this invention have a uniform roughness as compared to the heretofore used scratching technique which provided scratches that were not only jagged and fiber snagging but also were randomly distributed over the coating surface.

The present invention is based upon the unexpected discovery that metallic carbide coatings bonded to the working surface of a friction roll and having a pattern of laser-formed depressions covering substantially the entire coating provides a uniform, wear-resistant working surface texture over substantially the entire said working surface which will readily and quickly grip a strand or web as for example in draw rolls or the nip of mating crimper rolls and then quickly and readily release it after it passes through the nip. Without laser-engraving of the surface of the metallic carbide coatings, the desired quick release properties are not obtained. It is believed that the laser-engraving operation of the present invention as applied to the ceramic or metallic carbide coating bonded to the working surface of the roll forms a recast material on the roll which, in combination with the topography of the laser-engraved surface of the coating, results in the above-mentioned unexpected quick gripping and quick release properties. Reference is made hereinafter to photomicrographs which illustrate the metallurgical and/or topological changes wrought on the surface of the ceramic or metallic carbide coating in the present invention where, for example, when alumina is used, sapphire nodules are formed through the laser treatment.

No prior art has been found to disclose the concept of the present invention which involves first bonding a ceramic or metallic carbide coating to the working surface of a friction roll and then laser-engraving a pattern of a plurality of laser-formed depressions covering the entire working surface of said coating. Furthermore, no prior art has been found to disclose the concept of providing a laser-engraved ceramic or metallic carbide coating to friction rolls or in using friction rolls of that type for the purpose of driving webs or strands of materials. One result of use of the novel friction rolls in contact with textiles is that there appears to be less damage to the fibers of the textile due to snagging on jagged scratched surfaces of heretofore used friction rolls.

DETAILED DESCRIPTION OF THE INVENTION

Figure 2:
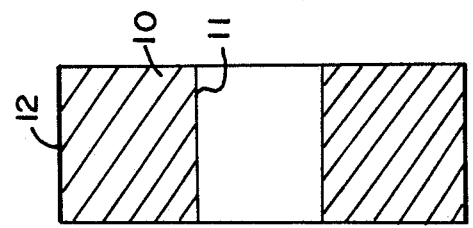
FIG. 2 is a sectional view on line 2—2 of FIG. 1.
Figure 1:
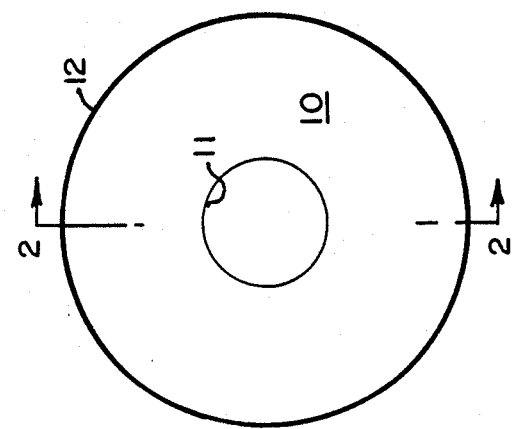
FIG. 1 is a side elevation of a crimper roll made pursuant to the present invention, specifically as described in Example 1.

Referring to FIGS. 1 and 2, a friction roll 10, preferably made of steel having an outside diameter of about 6 inches and a width of about 3 inches, is provided with a central bore 11 axially through it. The bore is formed with a keyway (not shown) and is adapted to fit on a mating drive shaft (not shown) provided with a key and keyway. The exterior cylindrical surface of the roll 10 is provided with a coating 12 which was applied in the manner described hereinafter in Example 1 and was laser-engraved to produce the pattern of laser-formed depressions as described in Example 1.

Any suitable ceramic coating or metallic carbide coating may be applied to the drive or working surface of the friction roll of the present invention. For example, tungsten carbide and mixtures and/or alloys of tungsten carbide with cobalt, nickel, chromium, iron and mixtures of such metals can be employed. In addition, titanium carbide, tungsten-titanium carbide and chromium carbide are also useful. The above-mentioned carbides can be used separately or mixed or alloyed with cobalt, chromium, tungsten, nickel, iron or other suitable metals. The ceramic coatings include alumina, mixtures of alumina with titania, chromia, mixtures of chromia and alumina, zirconia mixed with magnesia and the like.

The ceramic or metallic carbide coatings are applied to the metal surface of the roll by either of two well known techniques, namely, the detonation gun process or the plasma coating process. The detonation gun process is well known and fully described in U.S. Pat. Nos. 2,714,563, 4,173,685 and 4,519,840, the disclosures of which are incorporated herein by reference, and involves feeding oxygen, acetylene and nitrogen into a gun barrel along with a charge of the material being coated, e.g., ceramic or metallic carbide or metallic powder. The gas mixture is then ignited and the resulting detonation wave accelerates the powder to about 2400 ft./second while heating it close to, or above, its melting point. The maximum free-burning temperature of oxygen-acetylene mixtures occurs with about 45% acetylene and is about 3140 C. However, under detonation conditions, the temperature probably exceeds 4200 C. so that most materials can be melted by the process. The gun barrel is aimed at the substrate and the powder at or near above its melting point is deposited on the substrate. After each firing, the gun barrel is purged with nitrogen. This cycle is repeated about 4 to 8 times a second and each pulse of powder results in the deposition of a circle of coating of about 25 mm. in diameter and a few microns thick. The total coating is produced by many overlapping circles of coatings, each of which is composed of many overlapping, thin, lenticular particles or splats corresponding to the individual powder particles. The overlapping circles are closely controlled to produce a relatively smooth coating.

The plasma technique for coating substrates is conventionally practiced and is described in U.S. Pat. Nos. 3,016,447, 3,914,573, 3,958,097, 4,173,685 and 4,519,840, the disclosures of all of which are incorporated herein by reference. In the plasma coating technique, a plasma torch having a copper anode and tungsten cathode is usually used. A gas such as argon or nitrogen or a mixture of these with hydrogen or helium is caused to flow around the cathode and through the anode which serves as a constricting nozzle. A direct current arc, usually initiated with a high frequency discharge, is maintained between the electrodes. The arc current and voltage used vary with the anode/cathode design, gas flow and gas composition. The power used varies from about 5 to 80 killowatts depending on the type of torch and the operating parameters.

A gas plasma is generated by the arc and contains free electrons, ionized atoms and some neutral atoms and unassociated diatomic molecules when nitrogen or hydrogen are used. Plasma gas velocities with most conventional torches are subsonic but supersonic velocities can be generated using converging or diverging nozzles with critical exit angles. The temperature of the plasma may exceed 50,000 F. A ceramic coating powder or a metallic carbide coating powder is introduced into the plasma stream. The coating powder melts in the plasma and is caused to impinge upon the substrate. The plasma process of coating utilizes much higher temperatures than the detonation gun (or D-gun) process and also is a continuous process whereas the D-gun process is intermittent and non-continuous. The thickness of the coating applied by either the plasma process or D-gun process can range from 0.5 to 100 mils and the roughness ranges from about 50 to about 1000 $R_a$ depending on the process, i.e., D-gun or plasma, the type of coating material, and the thickness of the coating. $R_a$ is the average surface roughness measured in micro-inches by ANSI Method B46.1, 1978. The higher the number, the rougher the surface.

The ceramic or metallic carbide coating on the roll is further coated with a suitable pore sealant such as an epoxy sealant, e.g., UCAR 100 epoxy. This treatment seals the pores to prevent moisture or other corrosive materials from penetrating through the ceramic or metallic carbide coating to attack and degrade the underlying steel structure of the roll 10.

Following deposition of the coating on the cylindrical exterior working surface of the roll, e.g., roll 10, the resulting ceramic or metallic carbide coating bonded to the surface of the roll is ground with a diamond grinding wheel to produce a roughness of 8 to 30 $R_a$ using a profilometer. This grinding step is intended to provide a more even surface for application of the laser-engraved patterns hereinafter described. Grinding steps similar to the one used herein are conventionally used to a large extent in grinding ceramic or metallic carbide coatings applied to rolls in the production of ink transfer rolls or drive rolls that are not laser-engraved.

Subsequent to grinding, the ceramic or metallic carbide coating is laser-engraved using a $CO_2$ laser in order to produce a suitable pattern and depth of laser-formed depressions in the coating surface. The depths of the laser-formed depressions can vary from a few microns or less to as much as 120 or 140 microns or more. The average diameter of each depression, of course, is controlled by the pattern and the number of laser-formed depressions per lineal inch. For example, suitable patterns include the square pattern, the 30 degree pattern and the 45 degree pattern and the number of laser-formed depressions per lineal inch extends typically from 80 to 550. A wide variety of laser machines are available for forming depressions in the ceramic or metallic carbide coating. In general, from 0.001 to 0.4 joules per laser pulse can be used and the laser pulses can have a duration of 20 to 200 microseconds. The laser pulse centers can be separated by 200 to 2000 microseconds as an illustration of the operation of the laser to form the laser-formed depressions. Higher or lower values can be employed and other laser-engraving techniques are readily available in the art. After laser-engraving, the roughness typically ranges from 20 to 1000 $R_a$.

Subsequent to laser-engraving, the laser-engraved surface of the ceramic or metallic carbide coating is brush finished to remove any excessive burrs and other loosely adhered materials. The wet brush finishing produces no substantial change in the surface roughness of the laser-engraved material. Any suitable technique of brushing can be used including the specific wet brushing technique described in Example 1. However, other modifications and other techniques are available and can be used by the skilled worker, e.g., honing, abrasive sanding and/or grinding.

Figure 3:
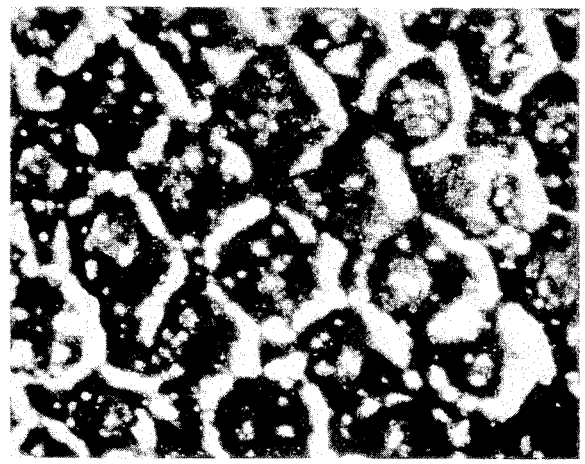
FIG. 3 is a reproduction of a photomicrograph of the working surface of the laser-engraved coating produced as described in Example 1 at 275× magnification.
Figure 4:
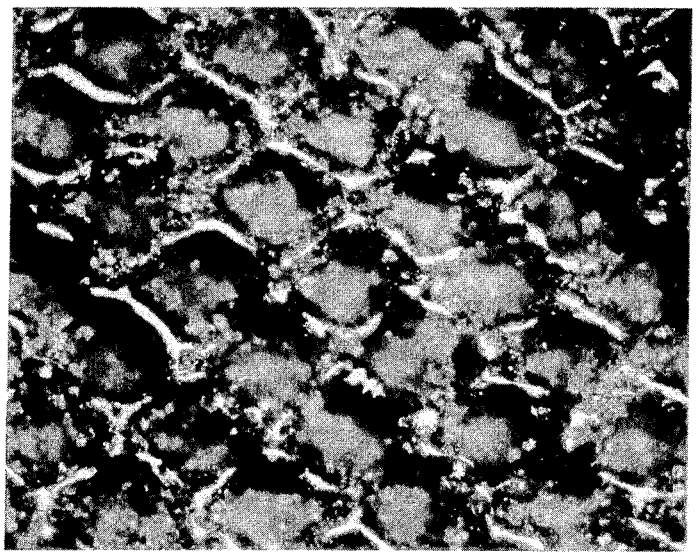
FIG. 4 is a reproduction of a photomicrograph at 208× magnification illustrating irregular light colored regions which are believed to be synthetic sapphire nodules produced by the laser treatment of the alumina coating produced in a manner similar to that described in Example 4, roll #4, band #3.

As best seen in FIGS. 3 and 4, the surface of the ceramic or metallic carbide coating after laser-engraving comprises a series of microcavities or cells formed by (a) vaporization of some of the material and (b) the melting, moving and recasting of additional material when the coating material is hit by the laser pulse. It is readily seen that each cell has a ridge of coating material surrounding it which was throun up by the melting, moving and recasting of coating material caused by the laser pulse. Some of the ridges overlap others which provides a clue to the direction of movement of the laser pulses. It has been found that the recast material differs considerably from the original coating. In general, it is denser and less porous than the original and multi-phase materials, e.g., alumina-titania mixtures, which as coated appear in separate phases but on recasting by laser treatment form a single phase material. In addition, most surprisingly, it was found that major morphological changes are produced in the alumina coating material after the laser pulse hits it. This is best illustrated in FIG. 4 by the bright colored elongated particles along the ridges of coating material thrown up out of the microcavities or cells. It is believed that these bright particles are synthetic sapphire nodules formed by the action of the laser on the alumina coating material.

The laser-engraved, ceramic-, or metallic carbide-, coated friction rolls of this invention find application in the textile and steel industries for moving and performing work on strands, i.e., thread, yarn, filament, or wire and webs or other elongate materials, e.g., thin sheet steel, woven knitted or bonded non-woven fabrics, ingots, slabs and the like. They can be used in the tape recording industry, the plastics sheet processing industry, photo-film processing industry, the photocopying industry, e.g., xerographic copy machines, newspaper handling machines and essentially any machines used in the strand or web or elongate material handling industries. The novel friction rolls can be in the form of crimper roll pairs that form a nip through which the strand or web passes or in the form of a single capstan roll or draw roll where the web passes one-half or one-fourth the way around the roll or the strand passes around the roll one-half or more times, e.g., 1, 2 or 3 times. The novel friction rolls can include draw pins or guide pins which do not rotate but work on the elongate material, e.g., yarn or tow, by moving the elongate material in frictional contact with the draw pin or guide pin. The frictional and surface characteristics of the novel friction rolls are well suited for drawing, crimping and any other operation which requires a quick grasp of the strand or web by the roll working surface and also a quick release at the appropriate time without snagging or tearing. The novel laser-patterned, ceramic-, or metallic carbide-, coated surfaces provide the quick grab-quick release capability and also are wear-resistant and capable of retaining the long-lasting and consistent frictional coefficients and surface characteristics.

The following illustrative Examples are presented. The following abbreviations and designations are used in the Examples and elsewhere herein:

LA-6: an alumina coating.
LA-7: a coating containing 60 wt. % alumina and 40 wt. % titania.
LC-4: a chromia coating.
LC-19: a coating containing 70 wt. % chromia and 30 wt. % alumina.
LW-15: a coating containing 86 wt. % WC, 10 wt. % Co and 4 wt. % Cr.
LW-19: a coating containing 88.5 wt. % WC, 8.5 wt. % Co and 3 wt. % Cr.
$R_a$: an indication of surface roughness as measured in micro-inches by ANSI Method B46.1, 1978. The higher the number, the rougher the surface.
Plasma: a technique for continuously applying a
Coating: ceramic or metallic carbide coating
Method: to a substrate by injecting the ceramic or metallic carbide powder into a plasma of ionized gas formed by establishing an electric arc across a stream of inert gas, specifically argon. A ceramic or metallic carbide powder is continously fed to the plasma which may be operating at a temperature as high as 50,000 F. The powder is heated and accelerated with the expanding gases in the plasma and is directed against the substrate where the powder cools, congeals and bonds to the substrate.
D-Gun: a detonation gun method of applying a
Coating: ceramic or metallic carbide coating to a
Method: substrate in which the ceramic or metallic carbide powder is charged to a gun barrel with nitrogen, oxygen and acetylene which is detonated to produce a temperature of about 6000 F. which melts the ceramic or metallic carbide powder and propels it against the substrate.
C/F: coefficient of friction as measured with a Shirley frictometer using a 150 denier nylon yarn. The roll carrying the coating is held stationary and the yarn is run half way around it at 260 yds. per minute surface speed while applying 10 grams input tension to the yarn.

The Screen Size and Pattern designation for each coating as identified in the Examples uses S to designate a square pattern in which the depressions are in axial rows, i.e., rows parallel to the axis of the roll or cylinder, and in circumferential rows, i.e., rows extending around the circumference of the cylinder or roll forming a circle having its center lying on said axis, and wherein the center of each depression in an axial row is in the same circumferential row as a depression center in each of the two rows adjacent to it.

The designation "30I" indicates that each axial row is offset from each adjacent axial row to the extent that depression centers in one row are offset at an angle of 30 degrees (relative to an axial row or axial line) from adjacent depression centers in each axial row adjacent to it.

The designation "45I" indicates that each axial row is offset from each adjacent axial row to the extent that depression centers in one row are offset at an angle of 45 degrees (relative to an axial row or line) from adjacent depression centers in each axial row adjacent to it.

The two or three digit number in the middle of the Screen Size and Pattern designations indicates the number of depressions per lineal inch measured in the direction of the first designation, i.e., for square patterns S, the middle two or three digit number gives the number of depressions or cells per lineal inch in the axial row which is the same as the number of cells in a circumferential row. As concerns 45I patterns, the middle two or three digit number designates the number of depressions or cells per lineal inch in the 45 degree diagonal direction and for the 30I patterns, the middle two or three digit number designates the number of depressions or cells per lineal inch in the 30 degree diagonal direction.

The two or three digit number on the right hand end of the designations indicates the nominal depth in microns of each depression as measured from the bottom of each depression to the top of the ridge surrounding it.

EXAMPLE 1

A pair of cylindrical solid steel crimper rolls, each having a diameter of 6", a width of 3" and a axial bore having a nominal diameter of 1.75" and a keyway for receiving a drive shaft and key, was degreased and otherwise prepared for coating with metallic carbide. Using a detonation gun operating at a temperature of about 6000 F. a metallic carbide coating comprising 88.5 wt. % tungsten carbide, 8.5 wt. % cobalt and 3 wt. % chromium was applied to the outer cylindrical working surface of each roll. A nominal thickness of 9 mils, plus or minus 3 mils, was applied to substantially the entire outer cylindrical working surfaces of said rolls. An epoxy sealant, epoxy UCAR 100, was applied to the coatings. The purpose of the sealant was to close the pores in the coating to protect the steel of the roll from corrosion. After cooling, the sealed coating was ground using a grinding wheel to a roughness of 15 to 25 $R_a$. Thereafter, the cylindrical surfaces were scratched with a coarse belt sanding machine to a roughness of 50 to 70 $R_a$ thereby producing conventional friction rolls. Thereafter, the coated cylindrical surfaces were abrasive sanded to a 20 to 25 $R_a$ thereby leaving 4 mil thick coatings. The initial grinding step and the scratching step after detonation coating are superfluous and preferably are omitted. However, this example also illustrates that a conventional roll can be reground and subsequently treated to produce the novel rolls according to this invention. After sanding to a 20–25 $R_a$, the coated cylindrical working surfaces were laser-engraved to produce a 45 degree offset pattern of depressions having a nominal screen of 400, (one roll surface had 392 depressions per inch and the other 386, along the 45 degree diagonal relative to the axial direction on the exterior cylinder surface). An unengraved band approximately ⅛" wide was retained along each circumferential edge of each roll in order to avoid the possible formation of burrs which could cause abrasion of the cheek plates conventionally used adjacent crimper rolls. The average nominal depth of the depressions was 25 microns. Each depression was made by using 0.023 joule laser pulses each having a 64 microsecond duration. The pulse centers were separated by 500 microseconds.

The resulting laser-engraved rolls were subjected to wet brush finishing using a stocky, bristley brush having a 12" diameter and nylon bristles each having a diameter of about 0.005". The brush was mounted so that the bristle tips engaged the laser-engraved surface of the roll and was rotated at 1756 rpm while the laser-engraved roll was rotated at 40 rpm. As the laser-engraved roll and bristley brush were rotated, an aqueous abrasive slurry was applied to the laser-engraved roll at the nip of its contact with the bristley brush. Both the brush and the roll were rotated in the same rotational direction, i.e., both clockwise or both counterclockwise.

The resulting pair of rolls was used as a crimper roll set to crimp nylon filaments of 22 denier in a tow band across the 3" faces of the rolls. This type of tow is considered to be one of the more difficult types to crimp. Also, this type of tow is considered to be aggressive to the crimper roll tending to cause high wear. After crimping, the tow was in a cohesive bundle in which the nylon filaments appeared to have a good crimp. A significant production run to tow was crimped by the novel crimper rolls and substantially no wear was observed on the rolls.

EXAMPLE 2

An additional set of two rolls identical to the set described in Example 1 was prepared for coating, coated with a metallic carbide coating and processed in the same manner as the rolls described in Example 1 except that, instead of a 45I diagonal pattern, the laser-engraved depressions were in a square pattern having a nominal screen of 400, i.e., about 396 depressions per inch in each circumferential row on the cylindrical surface and 403 depressions per inch in each axial row on the surface. Each depression had a nominal depth of 25 microns. The laser-engraved, coated rolls were used to crimp both 5 and 15 denier polyester fiber intended for use as a thermal insulating filament material. The rolls performed successfully in crimping the polyester fibers.

EXAMPLE 3

In order to illustrate the consistency of the coefficient of friction of roll surfaces coated and laser-engraved in accordance with this invention, the following coatings were prepared and laser engraved. In each case the coating was applied to a 2" diameter hollow aluminum roll which was used in this example for test purposes. Six aluminum rolls were used and each was coated with the ceramic or metallic carbide coating identified in Table 1 below. Specifically, rolls #1 and #2 were each coated with LC-4 ceramic coating which is chromia applied by the plasma technique. Rolls #3 and #4 each were coated with ceramic coating LA-7 which is a detonation gun-applied ceramic comprising 60 wt. % alumina and 40 wt. % titanium dioxide. Rolls 190 5 and #6 were each coated with LW-19 coating which is the same metallic carbide coating as identified in Example 1, i.e., 88.5 wt. % tungsten carbide, 8.5 wt. % cobalt and 3 wt. % chromium. An epoxy sealant, epoxy UCAR 100, was applied to each coating. Each of these rolls were laser-engraved with 3 or 4 bands of screen patterns as identified in Table 1.

In Table 1 below the designation $R_a$ designates roughness measurements. Each roughness number represents the mean of five readings taken around each band. All readings were taken at an angle of about 10 degrees to the roll axis. Also, in Table 1, C/F designates coefficient of friction of the bands which was measured. Several readings were made in both directions of rotation and showed very little difference in the coefficient of friction readings obtained. As can be seen in Table 1, roughness readings and coefficient of friction readings were made on each coating before brushing and after brushing with the nylon bristle brush and aqueous abrasive slurry as described in Example 1. The results shown in Table 1 illustrate the consistency of the coefficient of friction from coating to coating of the same kind as well as from coating to coating of the different types shown in Table 1. For example, the lowest coefficient of friction after brushing was shown by coating #2 on roll #3, namely, 0.22, and the highest coefficient of friction after brushing was shown by the coating #1 on roll #1, namely, 0.265. The variance in coefficient of friction after brushing from the lowest to the highest was very small illustrating the consistency in the coefficient from coating to coating and even in coatings of different types and patterns.

TABLE 1

| Roll No. | Coating and Method | Band No. | Screen Size & Pattern | Before $R_a$ | Brush C/F | After $R_a$ | Brush C/F |
|---|---|---|---|---|---|---|---|
| 1 | LC-4 (chromia) Plasma | 1 | S-180-90 | 350 | .275 | 365 | .265 |
| | | 2 | S-225-20 | 154 | .23 | 152 | .245 |
| | | 3 | S-180-30 | 190 | .255 | 193 | .26 |
| 2 | LC-4 (chromia) Plasma | 1 | S-450-20 | 63 | .30 | 62 | .245 |
| | | 2 | S-320-18 | 122 | .27 | 120 | .245 |
| | | 3 | S-180-20 | 101 | .315 | 104 | .24 |
| 3 | LA-7 (alumina-titania) D-Gun | 1 | S-180-20 | 92 | .34 | 77 | .225 |
| | | 2 | S-180-40 | 250 | .29 | 249 | .22 |
| | | 3 | S-180-60 | 314 | .25 | 328 | .225 |
| | | 4 | 30I-180-40 | 312 | .29 | 311 | .225 |
| 4 | LA-7 (alumina-titania) D-Gun | 1 | 30I-100-35 | 166 | .28 | 157 | .235 |
| | | 2 | 30I-320-35 | 217 | .26 | 218 | .235 |
| | | 3 | 30I-450-25 | 112 | .295 | 113 | .235 |
| | | 4 | 30I-450-12 | 86 | .24 | 84 | .225 |
| 5 | LW-19 (WC, Co, Cr) D-Gun | 1 | 30I-450-10 | 35 | .28 | 31 | .255 |
| | | 2 | 30I-450-25 | 140 | .26 | 138 | .24 |
| | | 3 | 30I-320-40 | 259 | .25 | 257 | .235 |
| | | 4 | 30I-180-40 | 312 | .25 | 307 | .23 |
| 6 | LW-19 (WC, Co, Cr) D-Gun | 1 | 45I-300-35 | 271 | .255 | 271 | .24 |
| | | 2 | 30I-320-20 | 133 | .27 | 138 | .235 |
| | | 3 | 30I-550-15 | 88 | .27 | 81 | .23 |
| | | 4 | 30I-630-4 | 29 | .38 | 26 | .24 |

EXAMPLE 4

In each of the following runs, the coatings designated in Table 2 were applied by the method designated in Table 2 to 4" diameter hollow aluminum rolls which were used in this example for test purposes. Each roll was provided with three bands of engravings having the screen size and patterns designated in Table 2. The coefficient of friction of each band was measured using the method set forth hereinbefore and the values measured are listed in Table 2.

Each of rolls, #1, 4, 7 and 10 were coated by the method designated in Table 2, sealed with an epoxy coating, i.e., epoxy UCAR 100, which was applied with a brush. The coating was then laser-engraved to provide the screen sizes and patterns set forth in Table 2 for each of Bands, #1, 2 and 3 on each of these rolls.

Each of rolls #2, 5, 8 and 11 were coated by the method designated in Table 2 followed by sealing by brushing on an epoxy sealant followed by sanding with a belt sander, followed by laser-engraving to produce the screen sizes and patterns designated in Table 2 for Bands #1, 2 and 3 of these rolls.

Each of rolls #3, 6, 9 and 12 were made with coatings designated in Table 2 using the method designated therein. Thereafter, an epoxy sealant was applied to the coating. After the coating cooled it was ground with a grinding wheel and laser-engraved in three separated bands to produce the screen sizes and patterns designated in Table 2 for Bands #1, 2 and 3 of these rolls.

All rolls, i.e., rolls #1-12, were subjected to wet brush finishing similar to that finishing method described in Example 1. After drying subsequent to the wet finishing method, the engraved coating of each band was tested for coefficient of friction. The results shown in Table 2 show that grinding and belt sanding of the coating prior to laser treatment had very little effect on the ultimate coefficient of friction of the final brushed, laser-engraved, coated surface.

TABLE 2

| Roll No. | Coating & Method | Band No. | Screen Size & Pattern | Roll #1 C/F | Roll #2 C/F | Roll #3 C/F |
|---|---|---|---|---|---|---|
| 1,2 & 3 | LC-4 (chromia) Plasma | 1 | 45I-80-115 | .26 | .255 | .26 |
| | | 2 | 45I-80-22 | .255 | .255 | .25 |
| | | 3 | 45I-300-22 | .255 | .25 | .265 |
| | | | | Roll #4 C/F | Roll #5 C/F | Roll #6 C/F |
| 4,5 & 6 | LA-6 (alumina) Plasma | 1 | 45I-80-135 | .26 | .255 | .255 |
| | | 2 | 45I-80-35 | .245 | .245 | .245 |
| | | 3 | 45I-300-35 | .25 | .25 | .255 |
| | | | | Roll #7 C/F | Roll #8 C/F | Roll #9 C/F |
| 7,8 & 9 | LC-19 (chromia-alumina) Plasma | 1 | 45I-80-120 | .255 | .23 | .235 |
| | | 2 | 45I-80-30 | .23 | .23 | .23 |
| | | 3 | 45I-300-22 | .23 | .23 | .24 |
| | | | | Roll #10 C/F | Roll #11 C/F | Roll #12 C/F |
| 10,11 & 12 | LW-15 (WC, Co, Cr) D-Gun | 1 | 45I-80-115 | .25 | .24 | .245 |
| | | 2 | 45I-80-30 | .235 | .235 | .245 |
| | | 3 | 45I-300-22 | .245 | .245 | .25 |

What is claimed is:

1. A friction roll for performing work on an elongate solid material by frictional contact therewith comprising a roll having an external surface defining a working surface and a ceramic or metallic carbide coating bonded to said working surface, said coating having a plurality of laser-formed depressions having a pattern providing a substantially uniform, wear-resistant recast surface to said working surface, said recast surface providing a different morphological structure than the coating and providing a consistent coefficient of friction over a roughness range from about 20 to 1000 Ra, said coefficient of friction measured with a Shirley frictometer using a 150 denier nylon yarn at 10 grams tension and a surface speed of 260 yards per minute.

2. A friction roll as claimed in claim 1 wherein said ceramic or metallic carbide coating is alumina.

3. A friction roll as claimed in claim 1 wherein said ceramic or metallic carbide coating is a mixture of alumina and titania.

4. A friction roll as claimed in claim 1 wherein said ceramic or metallic carbide coating is chromia.

5. A friction roll as claimed in claim 1 wherein said ceramic or metallic carbide coating is a mixture of chromia and alumina.

6. A friction roll as claimed in claim 1 wherein said friction roll is a crimper roll.

7. A friction roll as claimed in claim 1 wherein said friction roll is a draw roll.

8. A friction roll as claimed in claim 1 wherein said friction roll is a yarn package drive roll.

9. A friction roll as claimed in claim 1 wherein said friction roll is a friction pin.

10. A friction roll as claimed in claim 1 wherein said friction roll is a guide pin.

11. A friction roll as claimed in claim 1 wherein said ceramic or metallic carbide coating is tungsten carbide.

12. A friction roll as claimed in claim 1 wherein said ceramic or metallic carbide coating contains tungsten carbide, cobalt and chromium.

13. Method of forming a friction roll for performing work on an elongate solid material by frictional contact with said elongate solid material, said roll having an external surface defining a working surface comprising the steps of bonding a ceramic or metallic carbide coating to said working surface and laser-engraving the coating on said working surface with a plurality of depressions having a pattern covering substantially the entire said working surface and said laser-engraving step providing a uniform, wear-resistant surface texture of recast coating formed by said laser-engraving step over substantially the entire said working surface, said recast surface providing a different morphological structure than the coating and providing a consistent coefficient of friction as measured with a Shirley frictometer using a 150 denier nylon yarn at 10 grams tension and a surface speed of 260 yards per minute.

14. Method as claimed in claim 13 wherein said laser-engraved coating is subjected to brushing with an aqueous slurry of a finely divided abrasive after the laser-engraving step.

15. Method as claimed in claim 13 wherein said ceramic or metallic carbide coating is alumina.

16. Method as claimed in claim 13 wherein said ceramic or metallic coating is a mixture of alumina and titanium dioxide.

17. Method as claimed in claim 13 wherein said ceramic or metallic carbide coating is chromia.

18. Method as claimed in claim 13 wherein said ceramic or metallic carbide coating is a mixture of chromia and alumina.

19. Method as claimed in claim 13 wherein said ceramic or metallic carbide coating is tungsten carbide.

20. Method as claimed in claim 13 wherein said ceramic or metallic coating is a mixture of tungsten carbide, cobalt and chromium.

21. Method as claimed in claim 13 wherein said ceramic or metallic carbide coating is sealed with a pore sealant after said bonding step and before said laser-engraving step.

22. Method as claimed in claim 13 wherein the resulting sealed ceramic or metallic carbide coating is ground after the sealing step and before the laser-engraving step.

23. A device for performing work on an elongate solid material by frictional contact, the device including friction roll having a working surface, the device comprising, a ceramic or metallic carbide coating bonded to said working surface, said coating having a plurality of laser-formed depressions having a pattern providing a substantially uniform, wear-resistant recast surface to said working surface, said recast surface providing a different morphological structure than the coating and providing a consistent coefficient of friction over a roughness range from 20 to 1000 Ra, said coefficient of friction measured with a Shirley frictometer using a 150 denier nylon yarn at 10 grams tension and a surface speed of 260 yards per minute.

24. The device as claimed in claim 23 wherein said friction roll is a crimping roll and said elongate solid material is tow.

25. A device as claimed in claim 23 wherein said ceramic or metallic carbide coating is tungsten carbide.

26. A device as claimed in claim 23 wherein said ceramic or metallic carbide coating contains tungsten carbide, cobalt and chromium.

* * * * *

UNITED STATES PATENT AND TRADEMARK OFFICE
CERTIFICATE OF CORRECTION

PATENT NO. : 4,794,680

DATED : Jan. 3, 1989

INVENTOR(S) : Robert C. Meyerhoff; Richard C. Hill

It is certified that error appears in the above-identified patent and that said Letters Patent is hereby corrected as shown below:

Column 6, line 23, delete "throun" and substitute therefore --thrown--.

Column 6, line 47, insert comma (,) after "woven".

Column 7, lines 23-25, delete "Plasma: a technique for continuously applying a
                                 Coating: ceramic or metallic carbide coating
                                 Method: to a substrate by injecting the ceramic or
                                 me-" and substitute therefore:
                                 --Plasma Coating Method: a technique for continu-
                                 ously applying a ceramic or metallic carbide
                                 coating to a substrate by injecting the ceramic or
                                 me- --.

Column 7, lines 35-37, delete "D-Gun: a detonation gun method of applying a
                                 Coating: ceramic or metallic carbide coating to a
                                 Method: substrate in which the ceramic or
                                 metallic" and substitute therefore:
                                 --D-Gun Coating Method: a detonation gun method of
                                 applying a ceramic or metallic carbide coating to
                                 a substrate in which the ceramic or metallic--.

Column 9, line 52, delete "190" and substitute therefore --#--.

Column 10, line 52, delete comma (,) after "rolls".

Column 10, line 57, delete comma (,) after "Bands".

Signed and Sealed this

Sixteenth Day of July, 1991

Attest:

HARRY F. MANBECK, JR.

Attesting Officer

Commissioner of Patents and Trademarks